United States Patent
Molne et al.

(10) Patent No.: US 10,538,259 B2
(45) Date of Patent: Jan. 21, 2020

(54) FIT-FOR-DUTY DETECTION AND ALERTING SYSTEM FOR RAIL AND TRANSIT

(71) Applicants: Anders Molne, Cary, NC (US); Blake A Kozol, Jacksonville, FL (US); Wulf Kolbe, Kurten (DE); Rudolf Ganz, Overath (DE)

(72) Inventors: Anders Molne, Cary, NC (US); Blake A Kozol, Jacksonville, FL (US); Wulf Kolbe, Kurten (DE); Rudolf Ganz, Overath (DE)

(73) Assignee: Deuta America Corp, Richmond, VA (US)

( * ) Notice: Subject to any disclaimer, the term of this patent is extended or adjusted under 35 U.S.C. 154(b) by 0 days.

(21) Appl. No.: 15/938,799

(22) Filed: Mar. 28, 2018

(65) Prior Publication Data
US 2019/0300034 A1    Oct. 3, 2019

(51) Int. Cl.
*B60K 28/02*        (2006.01)
*B61L 27/00*        (2006.01)
(Continued)

(52) U.S. Cl.
CPC .......... *B61L 27/0083* (2013.01); *B61L 23/04* (2013.01); *B61L 25/021* (2013.01);
(Continued)

(58) Field of Classification Search
CPC .... B61L 27/0083; B61L 23/04; B61L 25/021; B61L 27/0005; B61L 27/0038; B61L 2201/00; B61L 2205/00; H04N 7/181; G06K 9/00845; G06K 9/00302; B60K 28/02; A61B 5/0022; G09B 19/00
See application file for complete search history.

(56) References Cited

U.S. PATENT DOCUMENTS

| 6,265,978 B1 | 7/2001 | Atlas |
| 8,781,796 B2 | 7/2014 | Mott et al. |
| (Continued) | | |

OTHER PUBLICATIONS

Li et al., Modeling of Driver Behavior in Real World Scenarios Using Multiple Noninvasive Sensors, 2013, IEEE, p. 1213-1225 (Year: 2013).*

(Continued)

*Primary Examiner* — McDieunal Marc
(74) *Attorney, Agent, or Firm* — Royal W. Craig; Gordon Feinblatt LLC

(57) ABSTRACT

A Fit-For-Duty network system and method that integrates several drowsiness detection devices with software analytics engine to more accurately predict, monitor and/or detect an actual unfit-for-duty condition or "positive event" in real time. The system monitors behavior based on changing operational conditions (such as speed of vehicle and pre-defined conditions, such as time of day and geographic conditions) to dynamically estimate both seriousness and probability of a positive event. Moreover, based on estimated seriousness and probability of a positive event the system self-initiates different levels of alerts ranging from light and sound, to connection to a third party intervener (an operations center), to stopping the vehicle.

24 Claims, 5 Drawing Sheets

(51) Int. Cl.
*H04N 7/18* (2006.01)
*G06K 9/00* (2006.01)
*B61L 23/04* (2006.01)
*B61L 25/02* (2006.01)

(52) U.S. Cl.
CPC ....... *B61L 27/0005* (2013.01); *B61L 27/0038* (2013.01); *G06K 9/00845* (2013.01); *H04N 7/181* (2013.01); *B61L 2201/00* (2013.01); *B61L 2205/00* (2013.01)

(56) References Cited

U.S. PATENT DOCUMENTS

| | | | | |
|---|---|---|---|---|
| 10,089,543 | B2* | 10/2018 | Fung | G06K 9/00302 |
| 2012/0072121 | A1* | 3/2012 | Mollicone | A61B 5/0022 |
| | | | | 702/19 |
| 2013/0069773 | A1* | 3/2013 | Li | B60K 28/02 |
| | | | | 340/426.1 |
| 2019/0114939 | A1* | 4/2019 | Kielbasa | G09B 19/00 |

OTHER PUBLICATIONS

Lajmi et al., Ethernet video analyzer for vehicle, 2014, IEEE, p. 62-67 (Year: 2014).*
Toral et al., Development of an Embedded Vision based Vehicle Detection System using an ARM Video Processor, 2008, IEEE, p. 292-297 (Year: 2008).*
Molina et al., Tonic EEG dynamics during psychomotor vigilance task, 2013, IEEE, p. 1382-1385 (Year: 2013).*
Oman, Charles M., Liu, Andrew M., Locomotive In-Cab Alerter Technology Assessment, Massachusetts Institute of Technology (2017).
Mackworth, N. H., The Breakdown of Vigilance During Prolonged Visual Search, Quarterly Journal of Experimental Psychology, vol. 1, pp. 6-21 (1948).
Basner, M and Dingles, D, "An Adaptive-Duration Version of the PVT Accurately Tracks Changes in Psychomotor Vigilance Induced by Sleep Restriction", Sleep, 35(2): 193-202 (2012).
Williamson, A. and Feyer, A., Moderate Sleep Deprivation Produces Impairments in Cognitive and Motor Performance Equivalent to Legally Prescribed Levels of Alcohol Intoxication, Occup. Environ Med.; 57(10): 649-655 (Oct. 2000)].

* cited by examiner

FIT-FOR-DUTY DETECTION AND ALERTING SYSTEM FOR RAIL AND TRANSIT

BACKGROUND OF THE INVENTION

1. Field of the Invention

The present invention relates generally to transportation safety systems and more particularly, to a detection and alerting system for making the fit-for-duty determination.

2. Description of the Background

In many industries including the railway industry there are various systems already being used to reducing the likelihood of serious accidents. Currently all US passenger and most freight locomotives are equipped with some type of alerter or "deadman" system. This is a railroad safety device that operates to detect engineer incapacitation, typically by requiring the engineer to release the dead-man's device momentarily and re-apply it at timed intervals. Alerter systems have been available for decades and, while required for class 1 railroads, they are optional for most transit systems such as commuter rail and busses. Accident data indicates that Alerters are far from perfect: "*Virtually all US main line passenger and freight locomotives are now equipped with some type of alerter or deadman system. However, between 1996 and 2002, fatigue and alertness accidents occurred on average three times per year, approximately 70% of them in alerter equipped locomotives.*" Charles M. Oman, Andrew M. Liu, Locomotive In-Cab Alerter Technology Assessment, Massachusetts Institute of Technology (2017)

More recently Automatic Train Control (ATC) and Positive Train Control (PTC) systems are becoming mandatory for certain railroads. ATC and PTC generally involve a speed control mechanism in response to some external input. However, PTC and ATC do not inherently provide any means of observing and assessing the operator's condition, including whether he or she is fit-for-duty or not. Thus, for train operation, PTC and ATC are monitoring the train but not the train operator or his Fit-For-Duty condition. This means that implementing ATC or PTC will increase the safety levels of train operation, but in areas where the operation is dependent on the operator's action, the same risk levels remain. Unfortunately, due to the large investments and modifications on the track side as well as onboard the train, implementation is slow and costly. Nevertheless, these systems should lower the risk for train collisions and over-speed operation.

In other market segments such as automotive and bus transit, there are a number of new technologies used for reducing risks of accident, such as proximity radar with automatic breaking. Other technologies observe driver behavior such as head nodding or lane drifting (as a possible sign of drowsiness), and impart vibration to the steering wheel to alert the driver.

Over the last ten-to-twenty years a number of technologies have evolved for the purpose of monitoring the operator's state of attentiveness, or "fit-for-duty." These include PERCLOS (PERcentage of eye CLOSure) which is based on a technology in which an infrared camera registers the operator's eye closures as described in U.S. Pat. No. 6,542,081 to William Torch. Some of these require the operator to wear eyeglasses with a camera (for example Optalert™), while others rely on one or more fixed-mount cameras (for example Guardvant, Inc.). The SmartCap solution requires a headband in order to measure electrical impulses for when the user is resisting falling asleep. The method is derived from EEG. These PERCLOS-based solutions have been thoroughly tested and are used in a few industries such as mining, where multiple implementations exists using eyeglass mounted cameras and vehicle mounted cameras. However, they have not gained wide acceptance in the commercial marketplace nor implemented on any large scale. For example, the eyeglass based system cannot easily detect distractions and experience a number of false positives due to the operator wearing a dust mask, hair or beard covering a large portion if the face. Unless a system is able to predict with accuracy nearly 100% of not-fit-for-duty instances without false positives, an automatic action such as stopping a train cannot typically be justified.

There are EEG monitors such as SmartCap® which claim a high degree of accuracy, but also require wearing a headband and it has proven extremely difficult to force employees to wear a headband to monitor their brain activity in order to measure fatigue.

There are also PVT (Psychomotor Vigilance Task) tests designed to assess an operator's state of alertness/fit-for-duty at a given point of time. The PVT tests may take the form of a pure reaction time test or a sustained cognitive application approach such as a Mackworth clock. [Mackworth, N. H., The Breakdown Of Vigilance During Prolonged Visual Search, Quarterly Journal of Experimental Psychology, vol. 1, pp. 6-21 (1948).] With this approach the operator's near-term expected performance is predicted through testing, as described in publications such as U.S. Pat. No. 8,781,796 by Mott et al, or U.S. Pat. No. 6,265,978 by Atlas. The PVT test is taken at the start of a shift and typically takes 3 to 10 minutes to complete. It is measuring the operator's reaction time and number of missed inputs to make a determination if the person is fit (or not) to safely operate a vehicle or machinery. One big advantage is that this PVT test assesses the Fit-For-Duty state whether it is due to sleep deprivation, intoxication, side effects of medicine or other reasons, and the test result is typically very objective where the same measuring limits can be applied to all individuals.

As described by ASTA (the Australasian Sleep Technology Association, "the psychomotor vigilance test (PVT) is a tool used to measure a person's behavioral alertness. It is a visual test which involves measuring the speed at which a person reacts to visual stimuli (e.g. a red dot against a black background)." Standard PVT tests are 10 minutes in duration although there are also versions with lower precision that are 3 and 5 minutes long. In addition, it is possible to define an adaptive duration implementation of PVT. Basner, M and Dingles, D, "An Adaptive-Duration Version of the PVT Accurately Tracks Changes In Psychomotor Vigilance Induced By Sleep Restriction", Sleep, 35(2): 193-202 (2012). The test measures the behavioral alertness in reaction to sleep loss and sleep deprivation. The first PVT test was developed by Professor David Dingles but today a number of versions are available for all kinds of product application including iPads® and iPhones®. The tests measures response times to the visual stimuli, which are presented to the subject on a device such as a laptop, at random times during the ten-minutes. Lapses in attention measured by the PVT can occur as a result of lack of sleep and/or prolonged hours on the job. Sleep loss has been shown to impact the reaction times measured by the PVT by lengthening reaction time values and increasing the number of lapses and false starts (i.e. responding in anticipation of the stimulus). These PVT systems have been thoroughly studied and verified, and are being used by organizations including NASA, but there has not yet been wide acceptance in the commercial marketplace. Their main disadvantage is that passing the PVT test does not guarantee that the operator is Fit-For-Duty later on in his shift. Drowsiness may set in after a few hours, or impact of medication taken later may set in well after the PVT test. In theory it would be possible to repeat the PVT test at predefined intervals but due to the duration of the test, this is normally not a feasible solution. The PVT test is generally considered to be equivalent to testing the reaction time reductions which a person may experience with a blood alcohol level of 0.03-0.05% or higher. It should also be noted as found in the "The Interactive Effects of Extended Wakefulness and Low-dose Alcohol on Simulated Driving and Vigilance" study by Howard et al., PMCID: PMC2266271 that sleep deprivation yielded similar results as blood alcohol levels and the combination of the two severely reduced the probability to pass the PVT testing, where sleep deprivation with a blood alcohol levels within legal limits produced worse results than just alcohol levels above the legal limit. The Mackworth Test (using his clock above) is a specific subset of PVT testing which is executed in a standardized manner that requires more than simple reaction time response. In a Mackworth Test, a subject is required to follow a ring of small circles which are sequentially illuminated one after the other in a clockwise manner. At random intervals, the test apparatus will skip over one of the small circles. This skip must be acknowledged by the test subject by tapping on the skipped circle. The Mackworth test approach has also been correlated with performance values and blood alcohol content as per the studies above. [A. Williamson and A. Feyer, Moderate Sleep Deprivation Produces Impairments In Cognitive And Motor Performance Equivalent To Legally Prescribed Levels Of Alcohol Intoxication, Occup. Environ Med.; 57(10): 649-655 (October 2000)].

Other more specific-problem-oriented solutions include breathalyzers to verify that an operator is not intoxicated (per specified limits), and which may be required before an operator is allowed to start their shift or power on the vehicle. Some organizations have deployed breathalyzer testing before starting a shift and there are a number of tests for automotive implementations using both breathalyzer as well as a skin scanner to determine the alcohol levels of the driver. Breathalyzers can be very effective and reliable for measuring a person's blood alcohol level, but that is all it does. Tools such as this can be an excellent complement to a Fit-For-Duty system but they only solve one issue. Another disadvantage is that such tools are typically only used prior to starting a shift and not during.

Of all the foregoing, simple alerter systems are the most commonly implemented systems in the railway industry to verify that an operator is awake and available. Every time the operator performs a prescribed action within a prescribed time period, a system timer is reset. If the operator fails to manually reset the timer the train will apply the brakes. The main disadvantage is that an operator can be extremely drowsy or even asleep and still hit the reset switch out of mechanical routine. In addition, the operator can pass the test albeit sleep deprived, intoxicated, distracted (on a cell phone or reading a book), or otherwise not fit-for-duty.

Moreover, existing solutions largely do not detect the transition of an operator from a state of fitness to a state of incapacitation in real time. While there are rudimentary procedures and devices to detect physical presence and/or require some rote physical response these approaches have several limiting disadvantages. First, they are time delayed and only detect severe absolute absence or incapacitation. Secondly, as they are dependent on intermittent requirements the systems do not have a positive indication of operator's fitness in order to make logical decisions. For example, when a safety-relevant system is transitioning from a fully automatic mode to a degraded or manual mode there exists no methodology to assure that the operator who is taking control is not incapacitated. This means that the safety system must consider the incapacitation of its operator as a non-self-revealing failure. This reduces the overall practical safety integrity of the system and also limits safety system design. For example, if a safety system could consider the incapacitation of its operator as a positive self-revealing failure some logical decisions and or actions could be considered permissible. This is not possible when such incapacitation is a non-self-revealing failure.

One of the issues contributing to the foregoing problem resides in the difficulty in quantifying an operators' level of incapacitation. The ability of a human being to properly operate a system and respond to dynamic conditions is assumed to varying degrees. Depending on the system's application domain and utilization, the probability of a human operator becoming incapacitated (not "Fit for Duty") is either calculated with a theoretical fixed value or ignored. Such calculation typically employ a theoretical fixed hazard rate, but such probabilities are very difficult to prove. The tendency is to utilize historical values based on similar operations.

However, such an approach has the limitation that the data is imperfect because it contains only self-revealing and recorded events. Additionally any increase in the hazard rate due to fatigue, medical issues, substance abuse, or distractions is not considered at all in a typical safety case. In order to achieve independence from such influences (unclear and non-transferable experience) or shortcomings (unknown vigilance) on the system safety, it is advantageous to test or monitor the operator's state of incapacitation during actual system operation in order to derive a hazard rate which is more robust and reflecting real world conditions. The collection of incapacitation events during actual safety-relevant system operation can be used in adjusting safety-relevant system design and analysis as well as comparing observed rates to the values used to calculate hazard rates.

Hazard rates are calculated to demonstrate the rate of risk of system usage, often expressed as the expected mean time between the occurrences of hazardous events (MTBHE). The calculated hazard rates are a demonstration of the efficacy of the safety assurance concepts implemented in such systems. The occurrence of individual hazards which may or may not contribute to an unsafe state of the target system are classified and analyzed depending on the type of the individual hazard. For example, common cause failures and non-self-revealing failures must be handled with extreme care for obvious reasons. Non-self-revealing failures which can act alone to cause the system to enter an unsafe or undesirable state are unacceptable in safety-relevant system design if they are identified. Of particular concern is the ability of a non-self-revealing failure to combine with another failure to decrease the MTBHE precipitously.

Of course, the chosen method must be validated to be correct (introducing no additional hazard) and the implementation and production of the corresponding devices need to be in accordance with applicable safety regulations. The determination of incapacitation should utilize a plurality of methods in order to minimize or eliminate false positives and validate incapacitation events robustly. The proposed invention implements these requirements in several ways including a software application implemented on hardware/computer used as human-machine-interface (HMI). The present system accomplished the foregoing with a plurality of determination methodologies implemented into a hardware and software package and including both the determination of operator incapacity independent of causation as well as the conventional HMI functionalities required for operation of the target safety-relevant system. Observed incapacitation events are validated by more than one determination methodology prior to being recorded as an event. State of the art determination methodologies include a Psychomotor Vigilance Test (PVT), Percentage of Eye Closure (PERCLOS), as well as an analysis of operating conditions and dynamics (for example the reaction time of an operator to changing stimuli of the system). In the future methodologies may be expanded to include additional or different methodologies such as the ability to determine the presence of substance by physical contact, additional ocular measurements such as saccade speed, etc. The invention defines the collection of such events as well as, operational data also available to the HMI (for example number of hours system or operator has been in operational control of target system) to determine a hazard rate for the frequency of incapacitation during system operation as well as the possibility to analyze various factors affecting trends in such data such as variance among operators, effects of time of day, shift length etc. on the consideration of the hazard of operator incapacitation in safety-relevant system design and operation.

SUMMARY OF THE INVENTION

It is therefore an object of the present invention to provide an improved method and computerized alerter system for the railway industry capable of detecting the transition of an operator from a state of fitness to a state of incapacitation in real time.

It is another object to provide an improved method and computerized alerter system for the railway industry that is capable of quantification of safety-relevant system operators' level of incapacitation, and that considers operator incapacitation to be a self-revealing failure via the use of a hardware and software extension to a Human Machine Interface (HMI).

In accordance with the foregoing object, the present system reliably verifies and monitors that an operator is awake and available using a combination of a psychomotor vigilance task (PVT) and PERcentage of eye CLOSure (PERCLOS) algorithm, the latter deployed by capturing a video stream of the train operator, using an active shape model (ASM) algorithm to locate the train operator's eyes, tracking the vehicle operator's eyes and applying the PERCLOS algorithm, compiling a PERCLOS metric, analyzing the combined metrics of the PVT software module and PERCLOS software module, plus train operator data, and external data using an analytical Fit-for-Duty software module, compiling a categorical severity metric corresponding to said train operator's fitness-for-duty, analyzing the categorical severity metric, sending an alert to a remote location and initiating appropriate action.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is an improved Fit-For-Duty network system that integrates several drowsiness detection devices with software analytics engine to more accurately predict, monitor and/or detect an actual unfit-for-duty condition or "positive event" in real time. The system monitors behavior based on changing operational conditions (such as speed of vehicle and pre-defined conditions, such as time of day and geographic conditions) to dynamically estimate both seriousness and probability of a positive event. Moreover, based on estimated seriousness and probability of a positive event the system self-initiates different levels of alerts ranging from light and sound, to connection to a third party intervener (such as an operations center), to stopping the vehicle.

Figure 1:
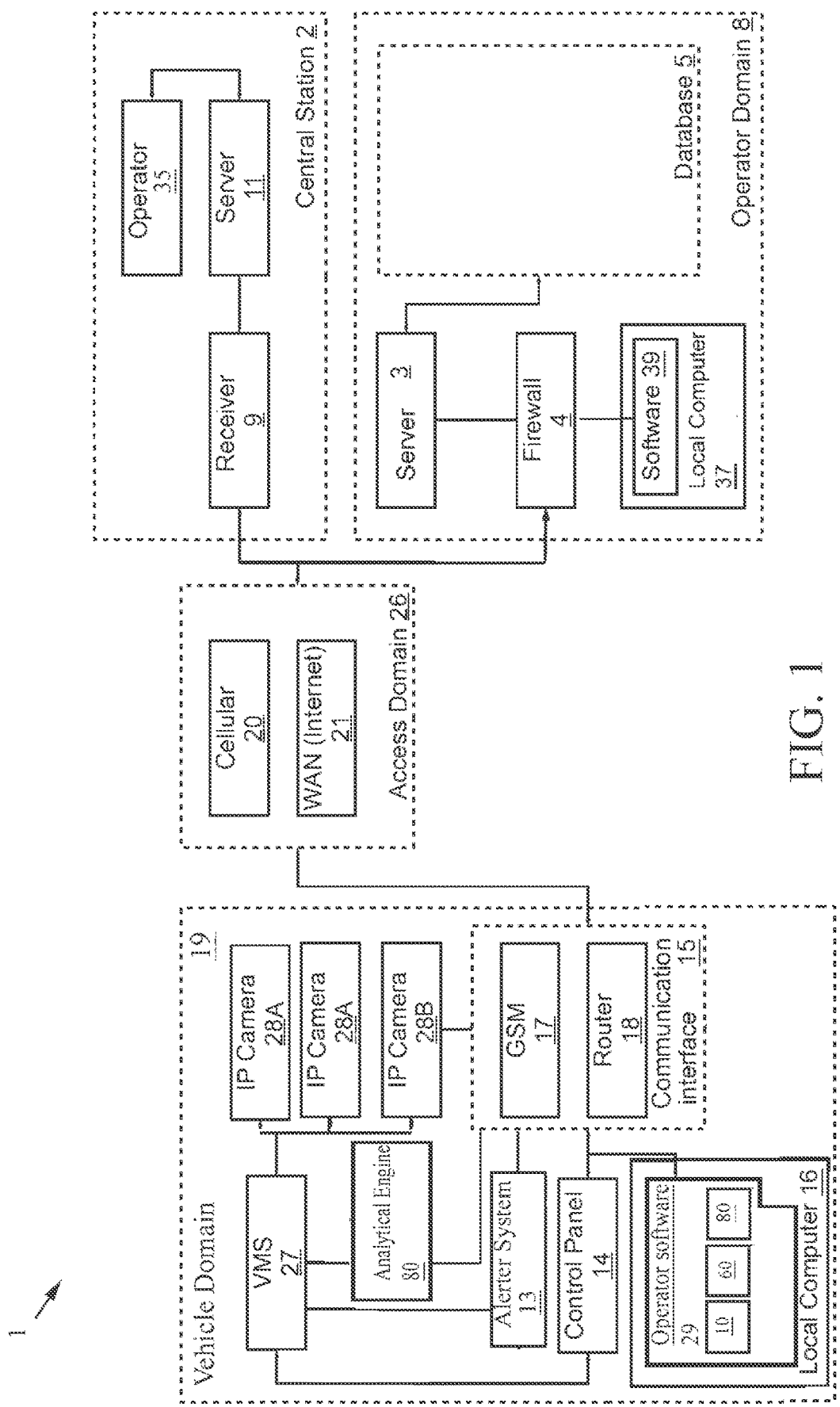
FIG. 1 is a block diagram illustrating the hardware architecture of the integrated Fit-For-Duty system 1 of the invention.

Turning now to FIG. 1, the hardware architecture of the integrated Fit-For-Duty system 1 is shown in accordance with the invention. The system 1 is characterized by a plurality of distinct domains, including a local vehicle domain 19, access domain 26, remote onsite-operator domain 8, and central operations center (COC) domain 2. The system 1 as a whole is capable of monitoring any number of vehicle domains 19 each of which may be a train. Fit-For-Duty information is transmitted from the vehicle domain(s) 19, via the access domain 26, to the onsite operator domain 8 for monitoring by a site operator, and when necessary on to the remote central operations center (COC) domain 2 for top level event notification, management and response purposes.

More specifically, each vehicle domain 19 comprises a control panel 14, which provides an interface between the access domain 26 and the various on-vehicle monitoring devices. The control panel 14 comprises processing, storage and human interface capabilities. In an embodiment, control panel 14 may be provided as an integrated unit, such as a dash-mounted unit or the like. Generally, the control panel 14 takes the form of a low-power robust computing device. The control panel 14 may communicate with various on-vehicle devices by way of wired or wireless interface, and for this purpose employs a dual-mode communications interface including a cellular transceiver (GSM) 17 for digital telephony, and a router 18 for internet communication. The control panel 14 is in operable communication through a video management server (VMS) 27 with a plurality of IP cameras 28 for the purposes of receiving IP train-operator footage. IP cameras 28 preferably include one or two visible spectrum IP cameras 28A plus one or two infrared IP cameras 28B each with an IR frequency of 950 nm as this light frequency penetrates and provides a high quality image through glasses and sunglasses and is not significantly impacted by sunlight. Various IP cameras 28 may interface with VMS 27 at the vehicle domain 19. The video management server 27 may comprise local storage capabilities for the purposes of storage of video footage. In embodiments, the VMS 27 may interface with the control panel 14 and/or communication interface 27 (described below). The VMS 27 includes the necessary circuitry to receive the multiple video input streams from the individual cameras 28 and to continuously write and store a short archive of the video streams at a camera sampling rate of 10 fps minimum at native 1080 p medium-quality M-JPEG video (or higher). This video is stored raw as individual frames each time-tagged in metadata. Assuming two cameras 28 with 20 fps and a strong compression rate such as H.264 and a minimum storage time of 48 hrs, this produces an archive of approximately 250 gigabytes.

In addition to the control panel 14, a local computer 16 is connected for providing an operator interface to the train operator, and to this end runs driver application 29.

The communication interface 27 in vehicle domain 19 serves the purposes of sending and receiving data locally and across the access domain 26. In one embodiment, the communication interface 15 comprises a conventional router 18 as a LAN/WAN interface. In this manner, the vehicle domain 19 may communicate across Ethernet or Wi-Fi LAN and send and receive data across the Internet. The communication interface 15 preferably additionally comprises a GSM (Global System for Mobile communication) digital mobile telephony interface 17 for the purposes of sending and receiving data across a cellular network. Both a LAN/WAN interface (router 18) and GSM interface 17 have an advantage of providing communications redundancy, wherein, for example, should the LAN/WAN interface become unavailable or intentionally disconnected by an intruder, for example, the GSM interface 17 may serve as a backup.

As alluded to above, the system 1 further comprises an onsite-operator domain 8 adapted for regional field-level management and network operation functionality by a regional train operator as is described herein. The onsite-operator domain 8 comprises a firewall 4 protecting an operator server 3 adapted to communicate with the vehicle domain 19 and COC 2. In addition to the operator server 3, one or more local computers (PCs) 37 are connected for providing an operator interface to the regional train operator(s), and to this end runs regional operation software 39.

The operator server 3 may interface with the access domain 26 by way of firewall 4, or other interfaces, such as load balancers and the like. The onsite-operator domain 8 further comprises a database 5 maintaining train operator profiles.

The system 1 further comprises the Central Station (COC) 2 adapted for communicating with numerous onsite-operators in domains 8, centrally managing local alarms and events and, if necessary, intervening in a situation to assist and/or take charge over the onsite-operator domain 8. As such, the COC 2 further comprises a receiver 9 in operable communication with the access domain 26 for the purposes of sending and receiving information to and from the control panel 14 of the vehicle domain 19. The COC 2 further comprises server 11 for performing various software implemented functionality as will be described. The server 11 may interface with an operator station 35 operated by a human operator.

Given the foregoing hardware and software architecture, the present system 1 provides an integrated Fit-For-Duty solution incorporating several computer-implemented test and monitoring processes for enhanced functionality. The software is modular, hosted locally in vehicle control panel 14, and centrally maintained and updated by the COC 2 Server 11.

The first software module is a psychomotor vigilance task (PVT) software module 10 for delivering a sustained-attention, reaction-timed task-based test procedure to the local train operator via local computer 16 to measure the speed with which the train operator responds to a visual stimulus. The PVT software module 10 delivers a simple visuosensory task, for example, wherein the train operator is required to press the enter key as soon as a color stimulus appears. The PVT software module 10 may track response time or other metric, such as how many times the enter key is not timely pressed when the color stimulus is displayed indicating the number of lapses in attention of the tested subject.

After successful completion of the PVT test, the Fit-For-Duty system 1 deploys a PERCLOS software module 60 for continuous monitoring. The PERCLOS module 60 captures infrared video data from cameras 28 continuously. The PERCLOS module 60 applies image recognition algorithms to identify the face shape/position and eyes and to monitor the eyes for eye closures. Based on this constant monitoring of the video feeds for eyelid closure, a data processing algorithm is deployed to determine the drowsiness level based on the eye closure duration, frequency and/or percentage of time.

The combined metrics of the PVT software module 10 and the PERCLOS module 60 are outputted to an analytical Fit-for-Duty determination module 80 that may also combine train or bus operator data and other external inputs from the operator domain 8 and COG 2, and applies a dynamic decision algorithm to evaluate Fit-For-Duty. Minor issues are flagged to the onsite operator at operator domain 8, and major issues are escalated, communicated, and action delegated to the COG 2.

Figure 2:
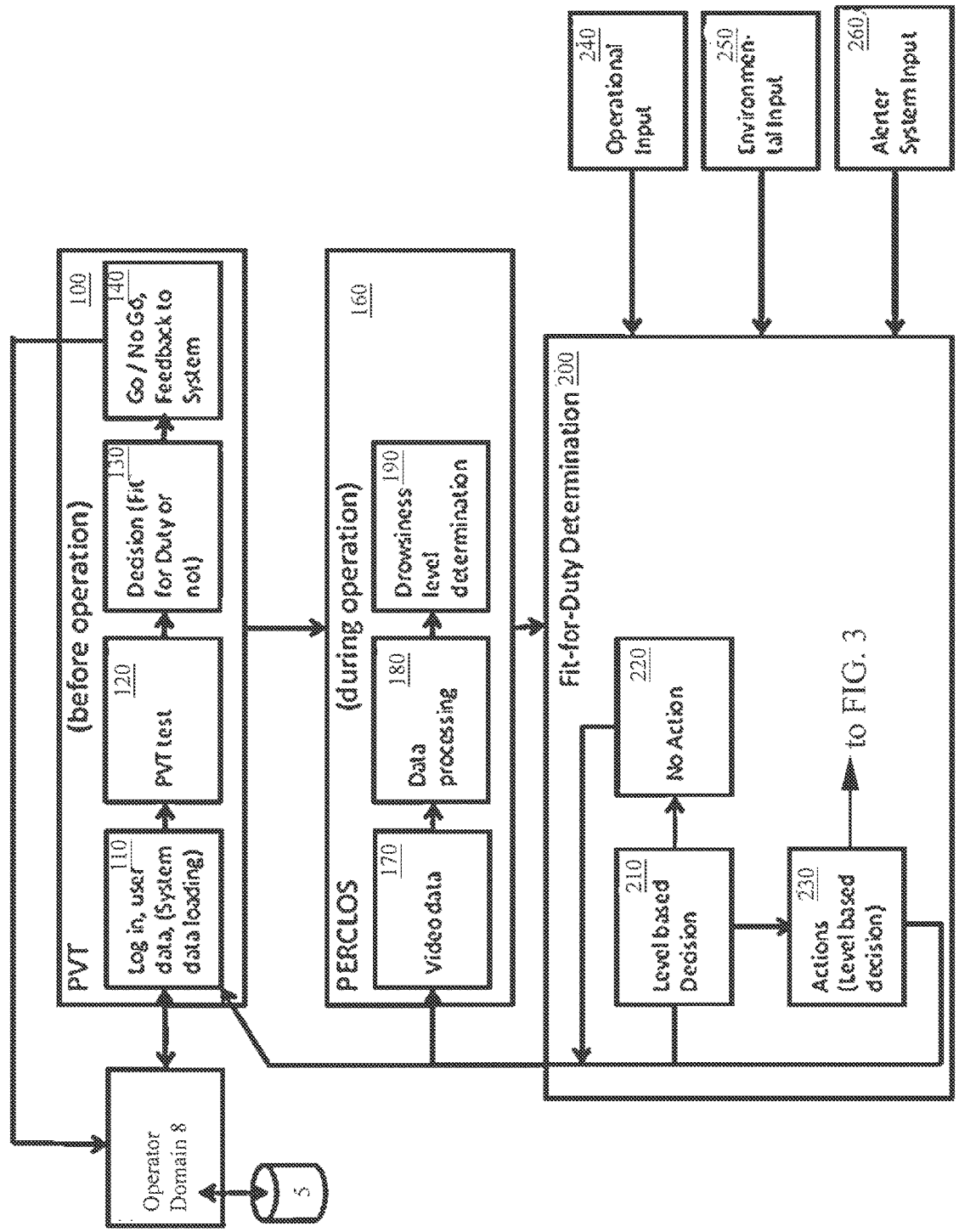
FIG. 2 is a flow diagram of the operational sequence of the of the integrated Fit-For-Duty system 1 of FIG. 1.

FIG. 2 is a flow diagram of the operational sequence. The train or bus operator starts his or her shift with a pre-operation start-up procedure 100, beginning at step 110 by logging into driver application 29 resident on local computer 16 (seen in FIG. 1) and providing his ID through entering a code or swiping an ID card. This is verified against the database 5 to authenticate the driver. With the known ID the local computer 16 computer will log the operators Fit-For-Duty data as well as download the operator's unique profile from the database 5, as well as providing on-duty data to operator domain 8 and COG 2. With the operator unique profile downloaded to the driver application 29 resident on local computer 16, the PVT software module 10 and the PERCLOS module 60 can use an algorithm optimized to this user's specific behavior or features.

As part of start-up procedure 100, at step 120 the operator is prompted by the PVT software module 10 to complete the PVT test (PVT software module 10 of FIG. 1). One skilled in the art will understand that the PVT software module 10 may resemble a number of existing "off-the-shelf" tests available which are proven and appropriate to use, such as some of which are free to access e.g. PEBL™ and Corware™. Other cognitive tests are available for purchase e.g. Joggle Research™ for Apple™ devices. The PVT test module 10 runs on local computer 16, which may be a drivers desk display with built in PC and communication functionality, such as a Deuta Werke MFT11 or DAC1080 product.

The result of the PVT test step 120 is passed to analytical engine 80 at step 130, which makes a simple pass/fail decision whether the operator is Fit-For-Duty or not.

Based on the predefined thresholds and the measured user reaction times, the PVT module 10 may prevent the vehicle from starting or moving at step 140, or permit moving only at a reduced speed. Feedback is communicated back to the operator domain 8, and in severe cases an alert may be sent to the COC domain 2 for top level event notification, management and response purposes, e.g., when a new operator is required and actions should be taken to analyze why the operator did not pass the PVT test 10.

Optionally, and in addition to the PVT test 10, other optional pre-operation tests may be included such as a breathalyzer for specifically verifying blood alcohol levels.

After successful completion of the PVT test 10, normal equipment operation can start. As part of the normal operation, the PERCLOS module 60 is instantiated and monitoring is initiated (step 160). At step 170 video data is captured continuously by IP cameras 28 and is stored at VMS 27. At step 180 the video data is subjected to the analytical engine 80 and facial recognition algorithms identify the face shape/position and eyes, and monitor the eyes for eye closures. Based on this constant video feed monitoring eyelid closure, analytical engine 80 deploys an algorithm to determine drowsiness level based on the eye closure duration (CLOSR), eye closure rate (CLOSNO), and/or percentage of eye closure time (CLOS %).

The data processing step 180 of the PERCLOS algorithm 60 employs a two-stage approach beginning with 1) detection (the entire image is searched to detect the face/eye) and followed by 2) eye tracking.

Figure 6:
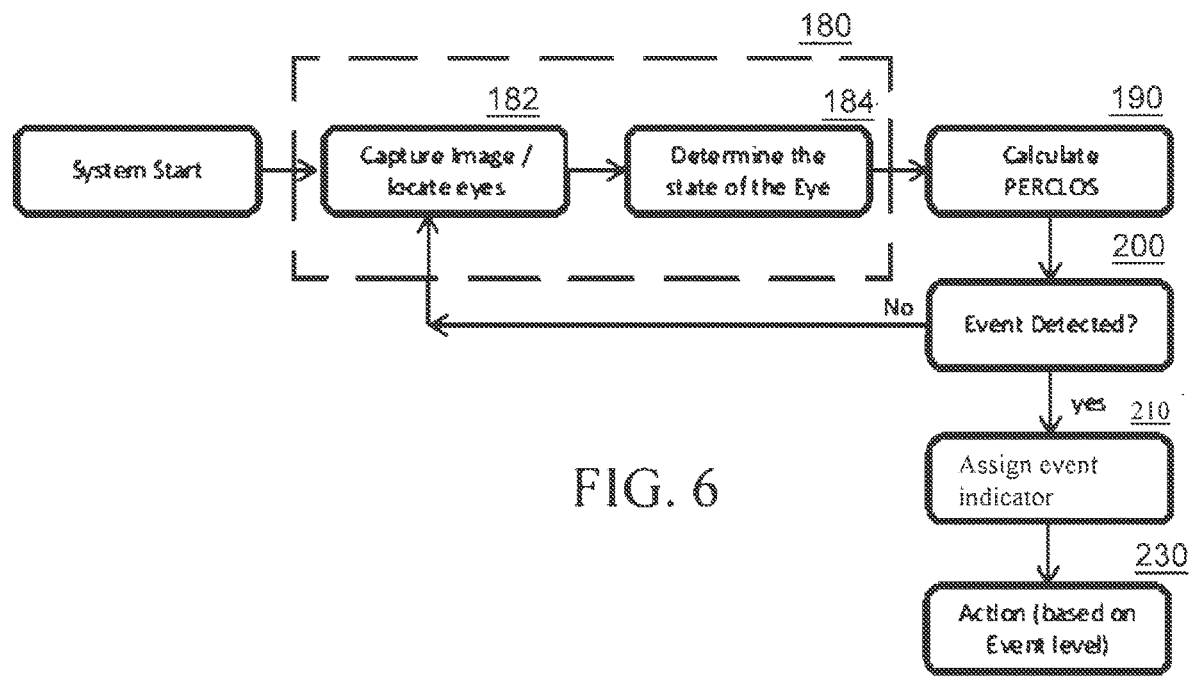
FIG. 6 shows the PERCLOS cycle.

The foregoing is shown in more detail in FIG. 6. During detection at substep 182 an active shape model (ASM) algorithm is used to precisely locate the individual's eyes. This is a statistical model of the shape of the face, and is used to map the main details of the face in the video stream to be able to precisely identify the eyes of the operator. Note that this adaptive learning model is also used for the face recognition model as a person may have a unique facial feature or wearing a protective mask, for protection against dust or germs, and the ASM algorithm is adjusted, or in essence, the model is adjusted to assume a different geometry of the measured points and lines in the person's face, for this individuals unique face model characteristics in order to be more precise in locating the eyes and detecting the facial features which is needed in order to estimate the view/direction of the view of the operator.

Searching an entire image during detection increases the computational complexity of the system. Therefore, usually after early detection of the face/eyes, in the next successive frames, face/eye tracking is performed. More specifically, and based on the initial ASM representation of the face features and eye positioning from substep 182, the exact points of eye position are tracked (these become the "tracked points") at substep 184 (FIG. 6). Tracking is done with a tracking algorithm that employs a Kalman filter or extended Kalman filter such as the Unscented Kalman Filter (UKF) as disclosed by Zhang et al., "Driver Fatigue Detection Based Intelligent Vehicle Control", Proc. 18th Int. Conf. on Pattern Recognition (ICPR), pp. 1262-1265 (August 2006). To reduce processing requirements, the tracking algorithm actively reduces the target area. With the camera frame rate running at 10 fps (or higher) as indicated above, it is not possible for the eye to move far in 0.1 second (or less) and so the search area is greatly reduced. The tracking algorithm starts its search in a continuous movement based on the increased probability that if the tracked point moved X mm directly right between the last two frames, the movement of the point is assumed to continue in the same direction. Once the eye track points are identified, it is also possible to measure the movement of the eyelids and blinking characteristics. Wang, M.; Guo, L.; Chen, W. Y., "Blink Detection Using Adaboost And Contour Circle For Fatigue Recognition", Comput. Electr. Eng., 58, 502-512 (2017). It has been proven that the drowsiness level can be detected and quantified through the number of eye blinks per time unit, duration of eye blinks, inconsistent frequency and percentage of closure over time interval. The present PERCLOS module 60 (FIG. 1) calculates the standard percentage of eye closure time (CLOS %), which is a function of eye closure duration (CLOSR), and frequency of blinks or eye closure rate (CLOSNO). For example, the duration of an eye blink for a rested individual is typically less than 200 ms, while the duration of a sleep deprived person often lasts around 500 ms, and durations over 1-2 seconds implies sleep/micro sleep.

The PERCLOS module 60 outputs the CLOS % metric to the analytic decision module 80 (FIG. 1) and at drowsiness level determination step 190, decision module 80 assigns a numeric rating to standard percentage of eye closure time (CLOS %) on a scale of 1-9. The analytic decision module 80 (FIG. 1) may optionally adjust the rating after considering other parameters. For example, based on the ASM representation of the face features and eye positioning relative to the known position of the camera(s) 28 it becomes possible to determine if the operator's view is directed towards the operating environment (dashboard, windshield), or if the operator is distracted and looking elsewhere, such as downward towards a mobile phone. Drowsiness describes multiple states that will impact attention level and reaction time for the operator including drowsiness, sleep apnea, and influence of medication, drugs, or alcohol. In addition, the operator's focus of vision may be monitored based on view and head position, so that if the operator is watching a phone, reading a book or facing the wrong direction rather than viewing instruments and tracks (if train), these types of events may also be recognized, recorded and analyzed.

Next, the analytic decision module 80 (FIG. 1) makes a Fit-For-Duty determination at step 200. This minimally includes at step 210 assigning a categorical event indicator to the drowsiness level determination of step 190, where:
  1-3: Green/No event (Alert)
  4-6: Yellow/Moderate drowsiness event
  7-9: Red/Severe drowsiness event Alternatively, the drowsiness level determination of step 190 may consider external factors including the operator's individual profile which was downloaded during the initiation process step 110 (FIG. 2). Each train operator is unique and his or her unique characteristics can be taken into account during the Fit-For-Duty determination 200. The external factors may include external operational conditions retrieved from the vehicle domain 19 of FIG. 1, and/or external environmental conditions retrieved from the operator domain 8 or elsewhere.

At step 240 (FIG. 2) the operational conditions are input and include for example speed of the vehicle, mode of operation (such as manual vs ATC mode in a train), track conditions and speed limitations, amount of traffic, and other factors that will impact the accident probability in case of drowsiness or lack of attention. For example, the same level of drowsiness will score differently depending on if the driver is operating a passenger train at 100 mph versus operating a locomotive on a closed track at 5 mph. At step 250 external environmental conditions are input and impact the evaluation of the severity are factors such as time of day (probability of drowsiness is higher during normal night hours), the operator's activity level and operator's existing performance history External factors are also optionally used as a substitute or enhancement to the PERCLOS function. In some operator environments, such as vehicles (car, bus, trucks, etc) existing technologies are available to monitor the driver for lane drift which is a common indicator for drowsiness and micro sleep. Bad driving behavior, such as drifting speed and erratic braking are also useful indicators for drowsiness and/or unfocussed operation of the vehicle.

At step 260 the analytical decision module 80 (FIG. 1) may make the drowsiness level determination of step 190 in consideration of the operator's activity level, which can be monitored and provided by a traditional Alerter system 13 (FIG. 1). The Alerter system 13 monitors an operator's actions and for each action a timer is reset to 0 seconds. If the timer reaches a maximum threshold, the operator is alerted with a visual and/or audible signal and must press an Alerter button. If no traditional Alerter system 13 is available, similar information may be provided from the vehicle's event recorder.

All external factors (240, 250, 260) together with input from the drowsiness level determination (step 190) are fed into the analytical decision engine 80 for evaluation at step 210, which sets the severity level. Toward this end a top-down decision-tree algorithm with boosting may be used to make the drowsiness level determination of step 190 and the various measure of operational conditions and/or external environmental conditions are used as boost inputs to the algorithm.

At step 220, for low level severity or if the event can be determined as a false positive, the PERCLOS module 60 continues monitoring without action. The system may, however, notify the vehicle operator that there is an underlying increased risk for drowsiness or lower Fit-for-Duty level by for example displaying a notification on the local computer 16. In addition, the system may automatically increase the sensitivity or lower the limit between a low/acceptable drowsiness determination level and a significant drowsiness level.

Figure 3:
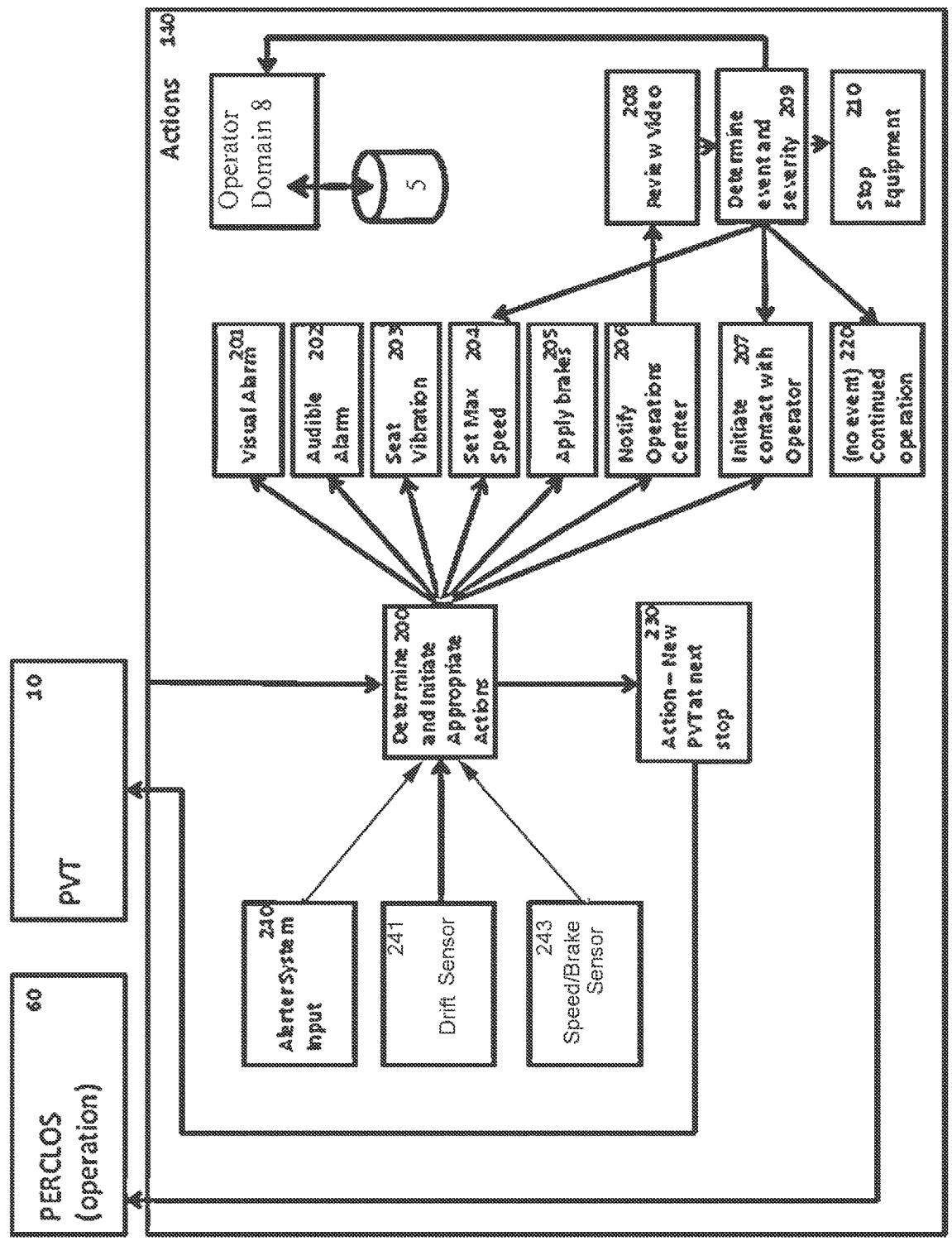
FIG. 3 is a flow diagram illustrating the analytical decision engine 80 sequence of actions.

For a significant drowsiness level detection at step 230, the analytical decision engine 80 is programmed to take a number of actions as seen in FIG. 3. Again, the specific actions as well as decision levels can be adjusted for each individual system to fit the unique requirements of the system operator. These actions normally include visual alarms 201 and/or audible alarms 202 locally at local computer 16, control panel 14 and/or operator domain 8, vehicle seat vibration 203, and vehicle breaking 205 either to reduce speed or to stop the vehicle. For a less severe event, the system may be pre-programmed to compare actual speed with maximum speed and to reduce maximum possible speed 204. In addition, to ensure a 100% system accuracy, the system will have a live monitoring of reported events. Although it is technically possible to have a very high reliability in the automatic drowsiness prediction and severity level setting, at least in the start-up phase while system is being optimized and operators' profiles are being recognized and optimized, it is recommended to use live monitoring to verify drowsiness events, ensuring appropriate level determination and for false positive detection. The confirmation or reclassification of events will further optimize the accuracy and improve the performance of the system 1.

The COG operations center 2 will automatically receive a notification (step 206) from the vehicle domain 19 when a moderate or severe event is recorded and detected. Included in the notification is the ten-second video clip of the recorded event which can quickly be reviewed by a live operator (step 208), type of event and severity level. This service center operator will verify that it is an actual event, its severity and type of event or a false positive. If there is a discrepancy between the live operator's determination (step 209) and the system generated determination, the live operator will make a system entry change. Such change data is entered into the individual operator's system profile and the operator's individual algorithm is updated accordingly to ensure that a more optimal profile is used next time. Note that the service interface used by the service center operator includes a number of different factors that can trigger an event, such as a drowsiness event (eye closure), distraction (not looking where he/she should), or loss of facial recognition (moving around). If applicable, other events are included such as speed/speeding and location (leaving the assigned path).

If the event is reclassified after the video review, the data that triggered the event is automatically used to readjust the system. The parameters used by the analytical decision engine 80 for setting the individual's drowsiness level based on the combined PVT and PERCLOS drowsiness level metrics employ an adaptive learning algorithm. Initially the generic values for duration of eye blinks, percentage time of eye closer etc., are used for all operators. However, if the video review provides a false positive due to high percentage of eye closure due to the individual characteristics of the operator, the drowsiness scale is adjusted to a weighted average between old scale and new measured value, and the vehicle operator's profile in database 5 is updated accordingly. Optimizing the operator profiles over time entails updating the parameters used by the analytical decision engine 80 for setting the individual's drowsiness level based on the combined PVT and PERCLOS drowsiness level metrics. These changes may accrue over a period of years. Thus, for example, if an operator blinks at a certain bend in the track because it faces the sun, this can be mapped to time of day/route/operator, etc., and the PERCLOS drowsiness level metrics can be made less sensitive accordingly.

The analytical decision engine 80 accomplishes the foregoing with a known least squares adaptive learning algorithm, for example, a least mean squares (LMS) algorithm that reduces mean square error or a recursive least squares (RLS) adaptive filter algorithm that recursively finds the scale-weighting coefficients that minimize a weighted linear least squares cost function relating to the inputs.

The learning process continues for any future manually adjusted values (based on video review) and over time the individual operator will have his or her profile uniquely optimized. In addition, the COC operation center 2 can initiate an immediate action, such as stopping the vehicle (step 210) or setting maximum allowed speed (step 204) and schedule a driver change at the next stop or at a minimum for the driver to conduct a new PVT test (step 230). Other action which may be required by the operation center operator includes notification to operational manager or to initiate a direct communication link between operator and a live person, such as a supervisor (step 209).

For a medium severity level where there is a concern that the operator is less alert than desired but the severity of the event is not high enough to require an immediate action other than notification to the operator, the system should require a new PVT test at next available stop or inactive time, such as the end/turning point of e metro line.

One way to further improve the accuracy of the analytical decision engine 80 event detection is to use input from a second monitoring system. In the automotive industry there has been tests in combining lane drift detection with PERCLOS (see A preliminary Assessment of Algorithms for Drowsy and Inattentive Driver Detection in the Road by DOT, DOT HS 88 (TBD) improved accuracy in both alarms reduction of false alarms by a factor of 2. In the rail industry it can be possible to measure the driver's acceleration and braking pattern and use this input to enhance the PERCLOS result. Alternatively, the optional Alerter system 13 (FIG. 1) can be used. The Alerter system 13 requires the operator to provide feedback, such as periodically pushing an Alerter button at a minimal time interval. The present Fit-For-Duty system 1 provides an integral Alerter system 13 using the vehicle operator local computer 16, in this case preferably employing a touch screen as Alerter button.

Figure 4:
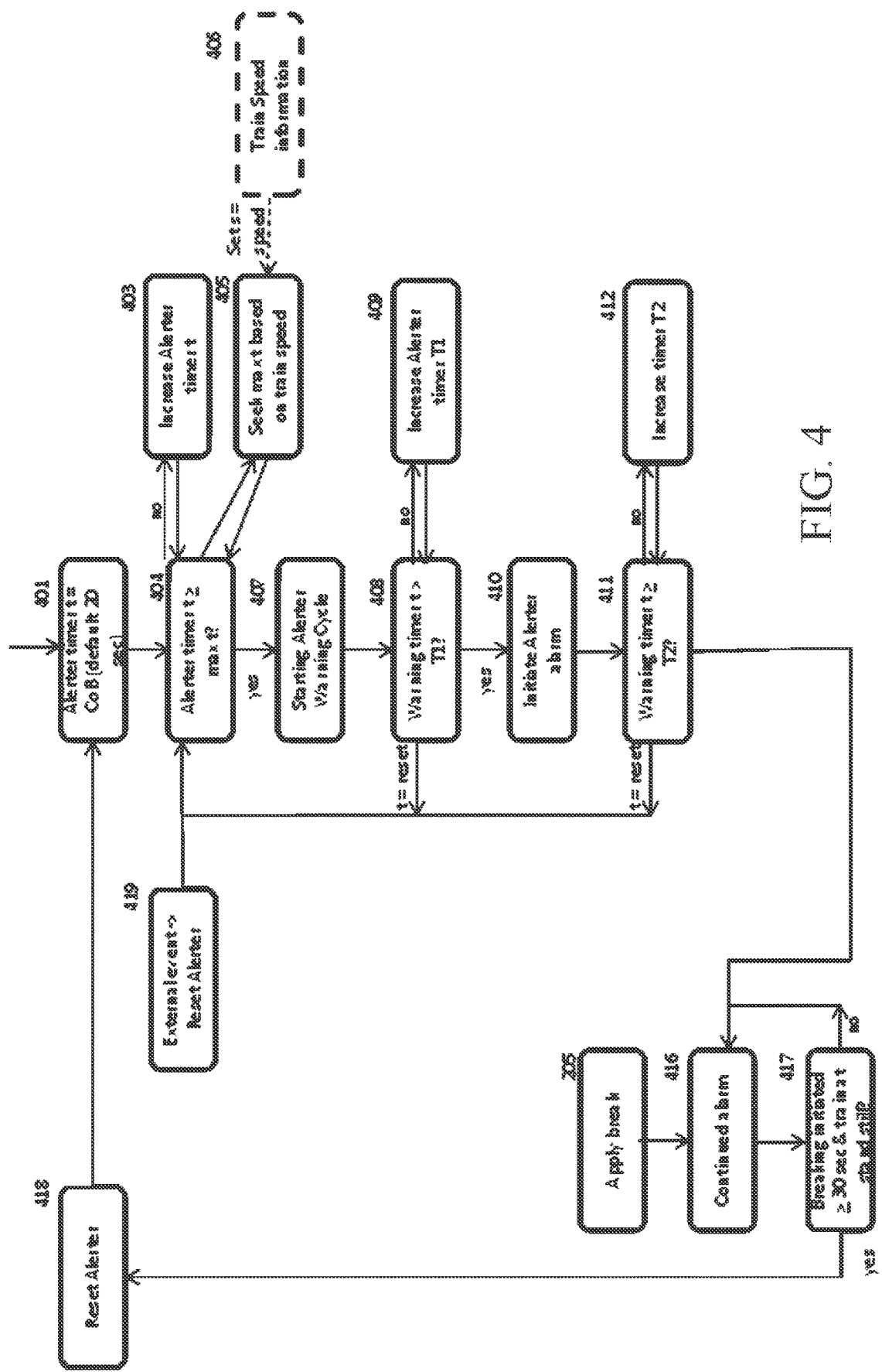
FIG. 4 is a flow diagram of the operational sequence of the Fit-For-Duty system 1 configured with the Alerter system 13 of FIG. 1 for a vehicle in which there is no traditional Alerter system installed.

FIG. 4 is a flow diagram of the operational sequence of the Fit-For-Duty system 1 configured with the Alerter system 13 of FIG. 1 for a vehicle in which there is no traditional Alerter system installed. In this case, the Alerter system 13 may simply be another software module running on control panel 14, or more preferably vehicle operator local computer 16. If the operator has been alerted, the software starts with setting an Alerter timer at a pre-defined countdown time (step 401). For a scenario where the software needs to start with an alert, the process flow will start at Initiate Alerter alarm (step 410). If the timer is not reset it will continue to increase (step 403, 404) to its maximum allowed value which is a function of at a minimum, the vehicles speed (step 405) where a higher speed sets a lower maximum timer value. It there is a reset event (step 419) the timer will be reset to 0. Reset is initiated when the driver presses the touch display of the Fit-For-Duty system or other dedicated reset button. The software may also capture input from other parts of the vehicles communication system where any type of driver initiated action will also reset the Alerter timer. If the timer reaches maximum value without detected operator's action, the Alerter Warning cycle is started (step 407). The default implementation uses blinking indicator/graphics on the Fit-For-Duty display. The warning timer will increase (step 408, 409) until the maximum predefined value is reached, then a loud audible alarm is added to the alert (step 410). If also the audible alarm is increased until this timer reaches its maximum timer value T2 (step 411, 412), a continued alarm (step 416) will sound and the system will initiate automatic breaking until the vehicle is at stand-still (step 417). It shall be noted that the PERCLOS module 60 remains active and monitoring in parallel.

Figure 5:
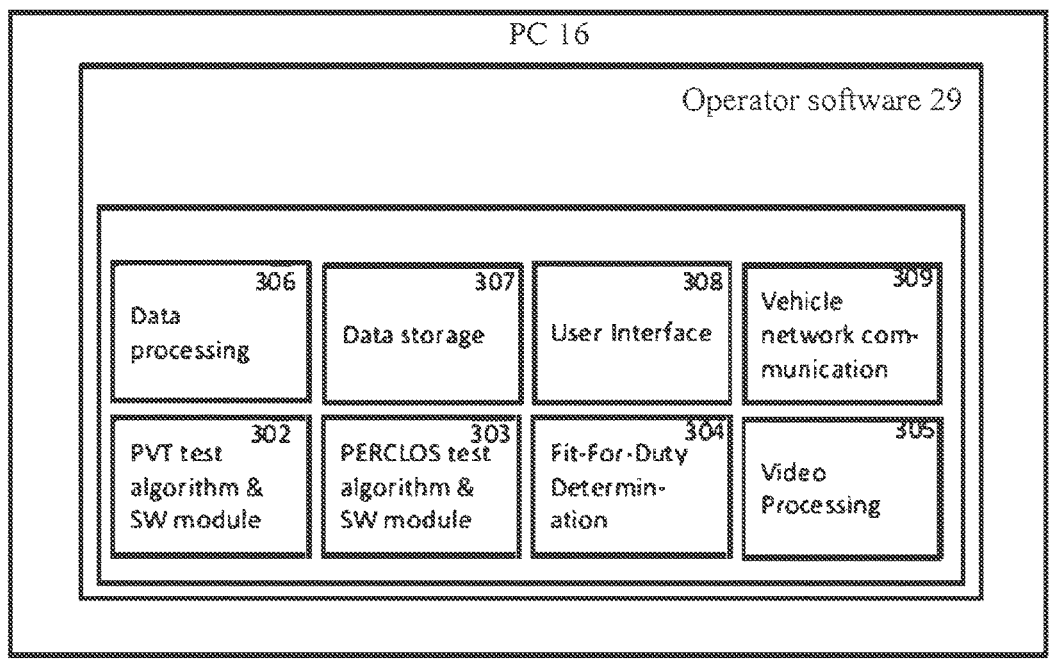
FIG. 5 is a perspective view of the operator local computer 16 and Fit-For-Duty operator software 29 running thereon.

The Fit-For-Duty operator software 29 running on operator local computer 16 is shown in FIG. 5. Local computer 16 includes a computer touch-screen display optimized for a vehicle environment in terms of durability, quality and vehicle communication resources. It includes a data processing unit 306, data storage 307 and User Interfaces 308 such as display module, indicator lights, touch screen and/or keys. The software modules running on the data processing unit 306 include the PVT module 10, the PERCLOS module 60, the analytical decision module 80, and optional alerter system module 13, all of which present graphical user interface as appropriate. All modules are stored in locally in the local data storage 307, but may be updated from operator domain 10 or COC 2. The computing device is also capable of processing video 305 for the PERCLOS monitoring and test. The driver's desk display 300 may include one of cameras 28 as a built-in camera, or may use external cameras. For optimal video capturing, at least one of the cameras 28 is preferably an infrared camera 26B with infrared illumination LEDs, inasmuch as IR light reduces interference from sunlight as well as glasses/sunglasses.

FIG. 6 shows the PERCLOS cycle inclusive of the above-described use of ASM at substep 182 to precisely locate the individual's eye position tracking at substep 184, calculation of the CLOS % metric and numeric rating on a scale of 1-9, the Fit-For-Duty determination at step 200 inclusive of substep 210 assigning a categorical event indicator to the drowsiness level determination of step 190, and penultimate action at step 230.

In a vehicle environment such as a transit bus or a train, the network communication with the other components of the vehicle domain 19 may be CAN bus or Ethernet based or potentially multi-protocol such as Profibus® or similar. The driver's display at local computer 16 may be dedicated for the Fit-For-Duty system 1 or share functions with other systems, such as speed monitoring. Through the existing vehicle communication network the local computer 16 will have access to vehicle information, such as current speed as well as remote communication with the operator domain 8 and COC 2.

The PVT module 10, the PERCLOS module 60, the analytical decision module 80, and optional alerter system module 13 algorithm will typically be downloaded remotely from the operator domain 8, and can likewise be remotely updated if a new/modified test program or severity determination model is needed. The analytical decision engine 80 will transmit relevant information at the end of each shift to the operator domain 8 for additional system optimization. It is possible for the PERCLOS system 160 to be fully optimized and preliminary false indications eliminated if there are no changes to vehicle environment or vehicle operators. Nevertheless, to ensure no false indications and to verify the accuracy of the PERCLOS system it should be assumed that there will always be a network operator at the operator domain 8 reviewing recorded events. This way it is acceptable to make the system too sensitive as false indications will not result in a system level false positive other than a review of the PERCLOS event.

One of the challenges with PVT test evaluation is that the differences in delays between a sleep deprived person and a non-sleep deprived person are very small and therefore the measurement equipment must be very precise. As presented by Khitrov, M. Y., Laxminarayan, S., Thorsley, D. et al. Behav Res (2014) 46: 140. https://doi.org/10.3758/s13428-013-0339-9, "PC-PVT: A platform for psychomotor vigilance task testing, analysis, and prediction" the gold standard for PVT testing, the PVT-192 equipment claims to be measuring within +/−1 ms, however the authors make the case that it would be acceptable with an error of up to around 10 ms. Most computing devices impose a delay between display presentation and computer recognized input which may vary in length. As an image is sent to be displayed, the actual presentation depends on the display refresh rate which is typically around 60 Hz, or every 17 ms. Other areas for variabilities are the refresh rate of the input device, such as capacitive or resistive touch screen, processing delays due to processor load, lower and higher level software behavior, etc. The resulting delays may be up to 100 ms and can vary in duration. Both the delay and variation of the delay can be reduced using the parallel processing methods described by Holger Manz et. al. in U.S. Pat. No. 9,164,860, which methods are today marketed under the product names of IconTrust® and SelectTrust® by Deuta Werke GmbH, and have been used to ensure that measured variations in the PVT test is maintained within a 10 ms limit or less.

Due to the reliability issues with a normal processing device, it is imperative to increase the computing device performance and eliminate any type of machine induced reaction time delay. By running the PVT testing on a PC or PC like device using IconTrust® and SelectTrust® by Deuta Werke GmbH the hardware delays are minimized and reliability of the PVT test result is at or close to 100 percent reliability.

Many changes, modifications, variations and other uses and applications of the subject invention will, however, become apparent to those skilled in the art after considering this specification and the accompanying drawings. All such changes, modifications, variations and other uses and applications which do not depart from the spirit and scope of the invention are deemed to be sectioned by the invention, which is to be limited only by the claims which follow.

What is claimed is:

1. A Fit-For-Duty system, comprising:
   a local monitoring system configured for monitoring a vehicle and comprising at least one video camera in operable communication with a central processor, non-transitory computer memory, computer program code stored on said non-transitory computer memory, a data communication interface for sending and receiving data, and a user interface for display and data entry to/from a vehicle operator, said processor being in operable communication with the non-transitory computer memory and controlled by the computer program code to execute the steps of,
   authenticating said vehicle operator,
   presenting a psychomotor vigilance task (PVT) software module to said vehicle operator and measuring a speed with which the vehicle operator responds to a visual stimulus, and compiling a pass/fail result,
   capturing a video stream of said vehicle operator including a sequence of frames from said at least one video camera,
   analyzing a frame of said captured video stream to locate the vehicle operator's eyes,
   analyzing a sequence of frames of said captured video using a PERcentage of eye CLOSure (PERCLOS) algorithm to track the vehicle operator's eyes,
   compiling a PERCLOS metric based on said analyzing step,
   analyzing the combined metrics of the PVT software module and PERCLOS software module, vehicle operator data, and external data using an analytical Fit-for-Duty software module and compiling a categorical severity metric corresponding to said vehicle operator's fitness-for-duty, and
   when the categorical severity metric exceeds a first predetermined threshold, transmitting an alert to a remote location.

2. The Fit-For-Duty system according to claim 1, further comprising a remote operator server in communication with said local operator system, said remote operator server comprising a database storing a plurality of vehicle operator profiles.

3. The Fit-For-Duty system according to claim 2, wherein said local operator system transmits said alert to said remote operator server, and said remote operator server updates a corresponding one of said plurality of vehicle operator profiles.

4. The Fit-For-Duty system according to claim 3, wherein said remote operator server analyzes said plurality of vehicle operator profiles for event patterns based on day, time and route.

5. The Fit-For-Duty system according to claim 4, wherein the analytic decision engine comprises an adaptive learning algorithm for adjusting event sensitivity based on said analyzing step.

6. The Fit-For-Duty system according to claim 5, wherein the adaptive learning algorithm considers time of day, light level, route, and operator activity level.

7. The Fit-For-Duty system according to claim 1, wherein when the categorical severity metric exceeds a predetermined threshold, said local operator system transmits a video clip to said remote operator server.

8. The Fit-For-Duty system according to claim 1, wherein when the categorical severity metric exceeds a second predetermined threshold, transmitting an alarm to a central command server.

9. The Fit-For-Duty system according to claim 1, wherein when the categorical severity metric exceeds a second predetermined threshold, braking said vehicle.

10. The Fit-For-Duty system according to claim 1, wherein when the categorical severity metric exceeds said first predetermined threshold, signaling a local alarm to said vehicle operator.

11. The Fit-For-Duty system according to claim 1, wherein when the categorical severity metric exceeds said first predetermined threshold, vibrating said vehicle operator's seat.

12. The Fit-For-Duty system according to claim 1, wherein the vehicle operator's user-profile is modified over time.

13. The Fit-For-Duty system according to claim 1, wherein the analytic decision engine assigns a numeric rating based on standard percentage of eye closure time (CLOS %).

14. The Fit-For-Duty system according to claim 1, wherein the analytic decision engine weighs external factors.

15. The Fit-For-Duty system according to claim 14, wherein the external factors include external operational conditions.

16. The Fit-For-Duty system according to claim 15, wherein the external factors include external environmental conditions.

17. The Fit-For-Duty system according to claim 1, wherein the external operational conditions include any one or more of speed of the vehicle, track conditions and speed limitations, and amount of traffic.

18. The Fit-For-Duty system according to claim 1, wherein the external environmental conditions include any one or more of time of day, light level, operator activity level, and the operator's performance history.

19. The Fit-For-Duty system according to claim 1, wherein the external environmental conditions include any one or more of time of day, light level, operator activity level, and the operator's performance history.

20. A method for monitoring a train, comprising the steps of:
   authenticating said train operator by a local computer;
   presenting a psychomotor vigilance task (PVT) software module to said train operator on said local computer and compiling a result;

capturing a video stream of said train operator including a sequence of frames;

analyzing a frame of said captured video stream and locating the train operator's eyes;

analyzing a sequence of frames of said captured video stream using a PERcentage of eye CLOSure (PER-CLOS) algorithm to track the vehicle operator's eyes;

compiling a PERCLOS metric based on said analyzing step;

analyzing the combined metrics of the PVT software module and PERCLOS software module, train operator data, and external data using an analytical Fit-for-Duty software module and compiling a categorical severity metric corresponding to said train operator's fitness-for-duty; and analyzing the categorical severity metric and transmitting an alert to a remote location.

21. The method of claim 20, wherein said analyzing step comprises estimating both seriousness and probability of a train event, selecting one of a group of different actions based on said estimation, and initiating an action based on said estimation.

22. The method of claim 21, wherein said step of initiating an action comprises automatically initiating an action.

23. The method of claim 22, wherein said action comprise braking said train.

24. A method for detecting transition of a train operators from a state of fitness to a state of incapacitation in real time by the steps of:

providing in a train a computer control panel in wireless communication with a central command center, and a plurality of IP video cameras in operable communication with said control panel for the purposes of receiving train-operator video;

maintaining a profile of a train operator at said central command center, said profile including historical safety data;

monitoring said train operator at said control panel for safety-relevant events and transmitting and recording each said event at said central command center;

classifying recorded events as one of a common cause failure, a non-self-revealing failure, and an incapacitation event capable of producing an unsafe outcome;

analyzing each said recorded event in real time in association with said operator profile and said event classification to calculate a hazard rate;

updating said profile of said train operator at said central command center.

* * * * *